United States Patent Office 3,262,936
Patented July 26, 1966

3,262,936
RING SUBSTITUTED-1-CYANOLOWER-ALKYLPIPERIDINES
Bernard L. Zenitz, Colonie, and Alexander R. Surrey, Albany, N.Y., assignors to Sterling Drug Inc., New York, N.Y., a corporation of Delaware
No Drawing. Filed July 19, 1965, Ser. No. 473,228
15 Claims. (Cl. 260—293)

This application is a continuation-in-part of our prior, copending application Serial No. 129,995, filed August 8, 1961, now abandoned.

This invention relates to new cyano-lower-alkyl-piperidines used in preparing 2- and 4-[(1-piperidyl)-lower-alkylamino]quinolines and 2- and 4-{N,N-bis-[(1-piperidyl)-lower-alkyl]amino}quinolines.

4 - [(1 - piperidyl) - lower - alkylamino]quinolines unsubstituted in the piperidine ring are known. The present invention resides in the concept of certain cyano-lower-alkyl-piperidines further substituted in the piperidine ring by substituents of a nature to be more fully described hereinafter, said cyano-lower-alkylpiperidines being useful as intermediates for the preparation of the aforesaid 2- and 4-[(1 - piperidyl) - lower - alkylamino]quinolines and 2- and 4 - {N,N - bis - [(1 - piperidyl) - lower - alkyl]amino} quinolines, which latter are disclosed and claimed in our divisional application S.N. 433,514, filed February 17, 1965.

The aforesaid 2- and 4-[(1-piperidyl)-lower-alkylamino]quinolines and 2- and 4-{N,N-bis-[(1-piperidyl)-lower-alkyl]amino}quinolines, whch are prepared from the compounds of the present invention, are represented by the formulas:

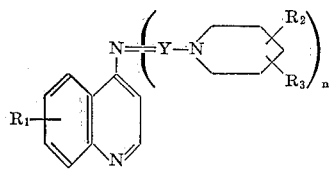

(Ia)

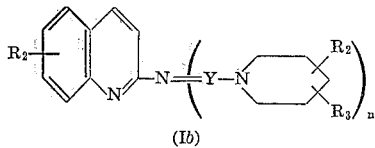

(Ib)

and are thus represented by the composite formula

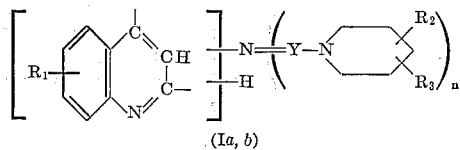

(Ia, b)

where one of the two free valences at the 2- and 4-positions of the quinoline nucleus is taken up by the group

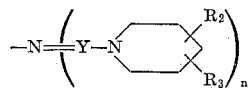

and the other of said positions when not taken up by the said group is taken up by a hydrogen atom; $n$ is one of the integers 1 and 2, and when $n$ is 1, the third valence on the amino nitrogen atom of the (1-piperidyl)-lower-alkylamino group is taken up by an atom of hydrogen; $R_1$ is a member of the group consisting of hydrogen, halogen (including, fluorine, chlorine, bromine, and iodine), lower-alkoxy, hydroxy, phenyl-lower-alkoxy, trifluoromethyl, lower-alkylmercapto, lower-alkysulfinyl, and lower-alkyl-sulfonyl; $R_2$ is a member of the group consisting of carbamyl, (i.e. $CONH_2$), N-lower-alkylcarbamyl, N,N-di-lower-alkylcarbamyl, hydroxy in other than the 2-position, hydroxy-lower-alkyl, lower-alkanoylamino in other than the 2-position, and cycloalkyl-lower-alkyl; $R_3$ is hydrogen or from one to five lower-alkyl radicals, Y is lower-alkylene containing from two to eight carbon atoms and interposing at least two carbon atoms between the amino nitrogen atom of the (1-piperidyl)-lower-alkylamino group and the ring nitrogen atom of the piperidine nucleus.

In the above general Formulas Ia and Ib, the substituent represented by $R_1$ when other than hydrogen, can be in either the 5-, 6-, 7- or 8-positions of the quinoline nucleus. When $R_1$ is lower-alkoxy, lower-alkylmercapto, lower-alkylsulfinyl, or lower-alkylsulfonyl, the lower-alkyl portion of said substituents can be either straight or, branched and can contain from one to four carbon atoms. $R_1$ is thus, inter alia, methoxy, ethoxy, isopropoxy, n-butoxy, methylmercapto, isobutylmercapto, methylsulfinyl, isobutylsulfinyl, methylsulfonyl, isobutylsulfonyl, and the like.

When $R_1$ is plenyl-lower-alkoxy, the lower-alkoxy portion of said radical contains from one to two carbon atoms, and the benzene ring of the phenylmoiety can bear one or more substituents of low molecular weight and of such nature that they do not interfere with or take part in the reactions, to be described hereinafter, used in the preparation of the compounds. Examples of such substituents include halogen (including fluorine, chlorine, bromine, and iodine), lower-alkyl, hydroxy, lower-alkoxy, methylenedioxy, lower-alkylmercapto, lower-alkylsulfinyl, lower-alkylsulfonyl, and the like. When the phenyl moiety is substituted by more than one of the above substituents, the substituents can be the same or different and can occupy any of the available positions on the phenyl ring. When the substituent is a lower-alkyl, lower-alkoxy, lower-alkylmercapto, lower-alkylsulfinyl, or lower-alkylsulfonyl group, said substituents can be either straight or branched and can contain from one to about four carbon atoms. Thus $R_1$ is also benzyloxy or phenethyloxy or such groups substituted in the phenyl ring by one or more of such substituents, inter alia, as fluoro, chloro, bromo, iodo, methyl, isobutyl, hydroxy, methoxy, n-butoxy, methylenedioxy, methylmercapto, isopropylmercapto, methylsulfinyl, isopropylsulfinyl, methylsulfonyl, isopropylsulfonyl, and the like.

When $R_2$ is hydroxy or lower-alkanoylamino, said radicals can occupy either the 3- or 4-positions of the piperidine ring, but not the 2-position. When $R_2$ is carbamyl, N-lower-alkylcarbamyl, N,N-di-lower-alkylcarbamyl, hydroxy - lower -alkyl, phenyl - lower - alkyl, or cycloalkyl-lower-alkyl, said radicals can occupy any of the three available positions on the piperidine ring.

When $R_2$ is hydroxy-lower-alkyl, it can be straight or branched and can contain from one to about six carbon atoms. $R_2$ thus stands, inter alia, for hydroxymethyl, 1-hydroxyethyl, 2-hydroxyethyl, 3-hydroxypropyl, 4-hydroxybutyl, 5-hydroxypentyl, 6-hydroxyhexyl, and the like.

When $R_2$ is lower-alkanoylamino, the lower-alkanoyl portion of said radical can be either straight or branched and can contain from one to about six carbon atoms. $R_2$ thus also stands, inter alia, for formylamino, acetylamino, propionylamino, α-ethylbutyrylamino, and the like.

When $R_2$ is N-lower-alkylcarbamyl or N,N-di-lower-alkylcarbamyl, the alkyl moiety in each of said radicals can contain from one to about four carbon atoms and can be either straight or branched. Thus $R_2$ also stands, inter alia, for N-methylcarbamyl, N-ethylcarbamyl, N-butylcarbamyl, N,N-dimethylcarbamyl, N,N-diethylcarbamyl, N,N-dibutylcarbamyl, and the like.

When $R_2$ is cycloalkyl-lower-alkyl, the cycloalkyl moiety contains from five to seven ring carbon atoms, and the lower-alkyl moiety contains from one to two carbon atoms. Thus the cycloalkyl-lower-alkyl radical includes such radicals as cyclopentylmethyl, cyclohexylmethyl, 2-(cyclohexyl)ethyl, cycloheptylmethyl, and the like.

In the above general Formulas Ia and Ib, $R_3$ stands for hydrogen or from one to five lower-alkyl radicals. When $R_3$ is one or more lower-alkyl radicals, each lower-alkyl radical can contain from one to about four carbon atoms, can be straight or branched and can occupy any of the five available positions on the piperidine ring, and when $R_3$ is more than one lower-alkyl radical, said radicals can be the same or different and can occupy the same or different positions on the piperidine ring. Thus $R_3$ stands inter alia, for methyl, ethyl, isopropyl, n-butyl, isobutyl, and the like.

In the above general Formulas Ia and Ib, Y is lower-alkylene containing from two to eight carbon atoms and interposing at least two carbon atoms between the amino nitrogen atom of the (1 - piperidyl) - lower - alkylamino group and the ring nitrogen atom of the piperidine nucleus. The lower-alkylene group can be straight or branched and thus stands, inter alia, for 1,2-ethylene [—$CH_2CH_2$—], 1,3-propylene [—$CH_2CH_2CH_2$—], 1,2-(2-methylethylene)

1,4 - butylene [—$CH_2CH_2CH_2CH_2$—], 1,5 - pentylene [—$CH_2CH_2CH_2CH_2CH_2$—], 1,8-octylene [—$(CH_2)_8$—], and the like.

The compounds of Formulas Ia and Ib are prepared by reacting a mono-[(1-piperidyl)-lower-alkyl]amine or a bis-[(1-piperidyl)-lower-alkyl]amine having the formula

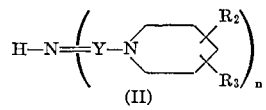

with a 2- or 4-haloquinoline having the formulas

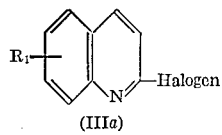

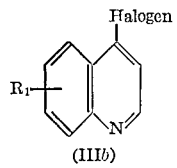

and which are thus represented by the composite formula

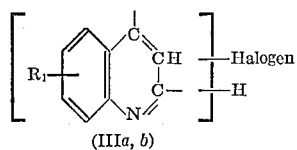

where one of the two free valences at the 2- and 4-positions of the quinoline nucleus is taken up by the halogen atom, and the other of said positions, when not taken up by the said halogen atom, is taken up by a hydrogen atom; and where $R_1$, $R_2$, $R_3$, Y, and $n$ have the meanings given above. The reaction is carried out at a temperature in the range from about 75° C. to about 150° C. and can be carried out either with or without the use of a solvent. Suitable solvents are those that are inert under the conditions of the reaction, for example, lower-alkanols, e.g. ethanol or isopropanol, and phenols. A preferred solvent is phenol.

The intermediate 2- and 4-haloquinolines of Formulas IIIa and IIIb are prepared by known methods. The 4-haloquinolines are prepared, for example, via the Conrad-Limpach or Jacobs-Gould syntheses which, in both cases, affords 4-hydroxyquinolines. The latter on reaction with a phosphorous oxyhalide afford the 4-haloquinolines of Formula IIIb. The 2-haloquinolines are prepared, for example, by the Knorr synthesis, or by reduction and subsequent cyclization of o-nitrocinnamic acids. In both instances, the resulting 2-hydroxyquinolines are converted to the corresponding 2-haloquinolines of Formula IIIa by reaction of the former with a phosphorous oxyhalide.

The intermediate mono- and bis-[(1-piperidyl)-lower-alkyl]amines of Formula II are prepared by reducing with hydrogen in the presence of a catalyst a 1-(cyano-lower-alkyl)piperidine, the subject matter of the present invention, having the formula

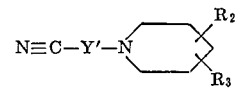

where $R_2$ and $R_3$ have the meanings given above; and Y' is lower-alkylene containing from one to seven carbon atoms and interposing at least one carbon atom between the ring nitrogen atom of the piperidine nucleus and the cyano group. As will be described hereinafter, the compounds of Formula IV have further utility other than as intermediates, and when not used as intermediates, the group $R_2$, in compounds of Formula IV, represents in addition, N-phenyl-N-lower-alkylamino and N-phenyl-N-lower-alkanoylamino in other than the 2-position and certain carbo-lower-alkoxy groups of a nature to be more fully described hereinafter, wherein the terms "lower-alkyl," "lower-alkoxy," "lower-alkanoyl," and "phenyl" have the meanings given above. These latter compounds are also considered to be within the purview of the invention. The reduction of the compounds of Formula IV is carried out in an organic solvent inert under the conditions of the reaction, for example, methanol, ethanol, or isopropanol, at a temperature in the range from about 20° C. to about 70° C. and at hydrogen pressures in the range from about 40 pounds p.s.i. to about 1,000 pounds p.s.i. When the reduction is carried out in a neutral medium, the bis - [(1-piperidyl)-lower-alkyl] amines of Formula II ($n$ is 2) are the predominant product although the mono-[(1-piperidyl)-lower-alkyl]amines ($n$ is 1) are also produced in minor amounts. On the other hand, if the solvent used is first saturated with anhydrous ammonia, so that the reaction medium is strongly ammoniacal, the predominant products are the mono - [(1 - piperidyl)-lower-alkyl]amines although the bis-[(1-piperidyl)-lower-alkyl]amines are also produced in minor amounts. Suitable catalysts are platinum oxide, palladium-on-charcoal, and rhodium-on-alumina. A preferred catalyst is rhodium-on-alumina.

The 1-(cyano-lower-alkyl)piperidines of Formula IV where Y' is lower-alkylene interposing two carbon atoms between the cyano group and the ring nitrogen atom of the piperidine nucleus are prepared by reacting an acrylonitrile with a piperidine in the presence of a basic catalyst. The reaction is represented by the equation:

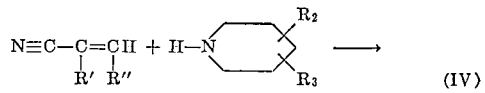

where $R_2$ and $R_3$ have the meanings given above and each of R' and R" stands for hydrogen or the methyl radical, or one of R' and R" is hydrogen while the other is the ethyl radical. The reaction is preferably carried out in an organic solvent inert under the conditions of the reaction, for example, water, benzene, dioxane, pyridine, or acetonitrile. A preferred solvent is water. Suitable basic catalysts are tri-lower-alkylamines, for example, triethylamine, or basic tertiary heterocyclic amines, for example pyridine, or quaternary ammonium hydroxides, for example, Triton® B (benzyl trimethylammonium hydroxide). A preferred basic catalyst is triethylamine.

The compounds of Formula IV where Y' is lower-alkylene interposing from one to seven carbon atoms between the cyano group and the ring nitrogen atom of the piperidine nucleus can also be prepared by reacting a cyano-lower-alkyl halide with an appropriately substituted piperidine in the presence of an acid-acceptor. The reaction is preferably carried out in an organic solvent inert under the conditions of the reaction, for example, benzene, tetrahydrofuran, acetone, methanol, ethanol, isopropanol, and the like. The acid-acceptor serves to take up the hydrogen halide split out during the course of the reaction and is a basic substance which forms water-soluble by-products easily separable from the main product of the reaction and includes such substances as alkali metal salts of weak acids, e.g., sodium carbonate, sodium bicarbonate, potassium carbonate, sodium acetate, and the like. The acid-acceptor can also be in the form of an excess quantity of the substituted-piperidine.

The novel compounds of the instant invention have the Formula IV. These compounds, when in free base form, are converted to the acid-addition salt form by interaction of the base with an acid. In like manner, the free bases can be regenerated from the acid-addition salt form in the conventional manner, that is, by treating the salts with strong aqueous bases, for example alkali metal hydroxides, alkali metal carbonates, and alkali metal bicarbonates. The bases thus regenerated can then be interacted with the same or different acid to give back the same or a different acid-addition salt. Thus the novel bases and all of their acid-addition salts are readily interconvertible.

It will thus be appreciated that Formula IV not only represents the structural configuration of the bases of the invention but is also representative of the structural entity which is common to all of our compounds of Formula IV, whether in the form of the free bases or in the form of the acid-addition salts of the bases. We have found that by virtue of this common structural entity, the bases and their acid-addition salts have inherent pharmacodynamic and chemotherapeutic activity of a type to be more fully decribed hereinbelow. This inherent pharmacodynamic and chemotherapeutic activity can be enjoyed in useful form for pharmaceutical purposes by employing the free bases themselves or the acid-addition salts formed from pharmaceutically-acceptable acids, that is acids whose anions are innocuous to the animal organism in effective doses of the salts so that beneficial properties inherent in the common structural entity represented by the free bases are not vitiated by side-effects ascribable to the anions.

In utilizing this pharmacodynamic activity of the salts of the invention, we prefer of course to use pharmaceutically-acceptable salts. Although water-insolubility, high toxicity, or lack of crystalline character may make some particular salt species unsuitable or less desirable for use as such in a given pharmaceutical application, the water-insoluble or toxic salts can be converted to the corresponding pharmaceutically-acceptable bases by decomposition of the salt with acqueous base as explained above, or alternatively, they can be converted to any desired pharmaceutically-acceptable acid-addition salt by double decomposition reactions involving the anion, for example, by ion-exchange procedures.

Moreover, apart from their usefulness in pharmaceutical applications, our salts are useful as characterizing or identifying derivatives of the free bases or in isolation or purification procedures. Like all of the acid-addition salts, such characterizing or purification salt derivatives can, if desired, be used to regenerate the pharmaceutically-acceptable free bases by reaction of the salts with aqueous base, or alternatively can be converted to a pharmaceutically-acceptable acid-addition salt by, for example, ion-exchange procedures.

It will be appreciated from the foregoing that all of the acid-addition salts of our new bases are useful and valuable compounds, regardless of considerations of solubility, toxicity, physical form, and the like, and are accordingly within the purview of the instant invention.

The novel feature of the compounds of the invention, then, resides in the concept of the bases and cationic forms of the new 1-(cyano-lower-alkyl)piperidines and not in any particular acid moiety or acid anion associated with the salt forms of the compounds; rather, the acid moieties or anions which can be associated in the salt forms are in themselves neither novel nor critical and therefore can be any acid anion or acid-like substance capable of salt formation with bases. In fact, in aqueous solutions, the base form or water-soluble acid-addition salt form of the compounds of the invention both possess a common protonated cation or ammonium ion.

Thus the acid-addition salts discussed above are prepared from any organic acid, inorganic acid (including organic acids having an inorganic group therein), or organo-metallic acid as exemplified by organic mono- and poly-carboxylic acids; such as found, for example, in Beilstein's Organische Chemie, 4th ed., volumes III, IV, IX, X, XIV, XVII, XIX, XXI, XXII, and XXV; organic mono- and polysulfonic and -sulfinic acids; such as found, for example, in Beilstein volumes VI, XI, XVI, and XXII; organic phosphonic and phosphinic acids; such as found, for example, in Beilstein volumes XI and XVI; organic acids of arsenic and antimony; such as found, for example, in Beilstein volume XVI; organic heterocyclic carboxylic, sulfonic, and sulfinic acids such as found, for example, in Beilstein volumes XVIII, XXII, and XXV; acidic ion-exchange resins, for example Amberlite® XE–66 resin; and inorganic acids of any acid-forming element or combination of elements, such as found in Mellor, Comprehensive Treatise on Inorganic and Theoretical Chemistry, Longman's, Green and Co., New York, N.Y., volumes I–XVI. In addition, other salt-forming compounds which are acidic in their chemical properties, but which are not generally considered as acids in the same sense as carboxylic or sulfonic acids, are also considered to be among the numerous acids which can be used to prepare acid-addition salts of the compounds of the invention. Thus there is also comprehended acidic phenolic compounds, such as found, for example, in volume VI of Beilstein, acidic compounds having "activated" or acidic hydrogen atoms, as for example, picrolonic acid, or barbituric acid derivatives having an acidic proton, such as found, for example, in Cox et al. Medicinal Chemistry, vol. IV, John Wiley and Sons, Inc., New York, N.Y. (1959). Also comprehended as salt forming agents are so-called Lewis acids which lack a pair of electrons in the outer "electron shell" and react with basic compounds having an unshared pair of electrons to form salts, for example boron trifluoride.

Thus appropriate acid-addition salts are those derived from such diverse acids as formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphinic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Pharmacological evaluation of the compounds of Formulas Ia and Ib have shown that they possess pharmacodynamic and chemotherapeutic properties, in particular, hypotensive, anti-malarial, anthelmintic, and trichomonacidal activities thus indicating their usefulness as blood pressure lowering agents, anti-malarial, anthelmintic, and parasiticidal agents.

The compounds of Formula II have been shown to possess hypotensive and coronary dilator activities and are thus useful not only as intermediates in the preparation of the compounds of Formulas Ia, and Ib but also have utility as blood pressure lowering agents and coronary dilators. The compounds of Formula IV have been shown to possess hypotensive, monoamine oxidase inhibitory, and antibacterial activities thus indicating their usefulness as blood pressure lowering agents, psychic energizers, and antibacterial agents. The compounds of Formula IV where $R_2$ is 2-carbethoxy, 3-carbomethoxy, 4-carbomethoxy, or 4-carboisobutoxy, $Y'$ is 1,2-ethylene, and $R_3$ is hydrogen are particularly useful for these purposes and are considered to be within the purview of the instant invention.

The structures of the compounds of the invention are established by their mode of synthesis and corroborated by the correspondence between calculated values for the elements and values found by chemical analysis.

The following examples will further illustrate the invention without the latter being limited thereto.

EXAMPLE 1

1-(2-cyanoethyl)-4-carbamylpiperidine [IV; $R_2$ is 4-CONH$_2$, $R_3$ is H, $Y'$ is CH$_2$CH$_2$]: To a solution of 18.82 g. (0.10 mole) of 4-carbamylpiperidine acetate and 13.11 g. (0.11 mole) of triethylamine in 125 ml. of water in a 250 ml. three-necked flask equipped with a stirrer, a thermometer, and a dropping funnel was added dropwise over a period of one hour 5.58 g. (0.11 mole) of acrylonitrile while maintaining the temperature between 14 and 20° C. The mixture was allowed to warm to room temperature, stirred for an additional hour and allowed to stand overnight at room temperature. The mixture was treated with 40 g. of solid potassium carbonate and the mixture extracted with chloroform. The chloroform extract was dried over Drierite®, filtered, and the solvent removed in vacuo leaving a white residual solid. The latter was recrystallized from ethyl acetate giving 12.4 g. of 1-(2-cyanoethyl)-4-carbamylpiperidine, M.P. 151.0–152.6° C. (corr.).

1-(2-cyanoethyl)-4-carbamylpiperidine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethyl phosphinic acid, p-aminophenylarsinic acid, phenylstibnic acid, phenylphosphinous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfmate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

1-(2-cyanoethyl)-4-carbamylpiperidine can be reacted with hydriodic acid to form 1-(2-cyanoethyl)-4-carbamylpiperidine hydriodide, useful as a characterizing intermediate.

1-(2-cyanoethyl)-4-carbamylpiperidine, in the form of its hydriodide salt, can be converted to the hydrochloride salt by passing an aqueous solution of the former over an ion-exchange resin saturated with chloride ions, for example Rohm & Haas' Amberlite® IRA–400 resin.

Following a procedure similar to that described above for the preparation of 1-(2-cyanoethyl)-4-carbamylpiperidine there was obtained 1-(2-cyanoethyl)-4-(N-phenyl-N-methyl)piperidine, M.P. 44.2–45.8° C. [prepared from 9.5 g. (0.05 mole) of 4-(N-phenyl-N-methyl)piperidine and 4.0 g. (0.075 mole) of acrylonitrile];

1-(2-cyanoethyl)-4-(N-phenyl-N-ethyl)piperidine dihydrochloride, M.P. 250.0–253.0° C. [prepared from 15.9 g. (0.078 mole) of 4-(N-phenyl-N-ethyl)piperidine and 5.8 g. (0.11 mole) of acrylonitrile];

1-(2-cyanoethyl)-4-(N-phenyl-N-acetyl)piperidine, M.P. 126.0–128.0° C. [prepared from 21.8 g. (0.10 mole) of 4-(N-phenyl-N-acetyl)piperidine and 6.5 g. (0.12 mole) of acrylonitrile];

1-(2-cyanoethyl)-4-hydroxypiperidine, B.P. 119–122° C./ 0.25–0.46 mm., $n_D^{25}$ 1.4961 [prepared from 20.24 g. 0.20 mole) of 4-hydroxypiperidine and 10.73 g. (0.22 mole) of acrylonitrile];

1-(2-cyanoethyl)-4-cyclohexylmethylpiperidine, B.P. 102.0–112° C./0.12 mm., $n_D^{25}$ 1.4889 [prepared from 12.67 g. (0.075 mole) of 4-cyclohexylmethylpiperidine and 4.40 g. (0.083 mole) of acrylonitrile];

1-(2-cyanoethyl)-3-acetylaminopiperidine, M.P. 69.2–73.2° C. [prepared from 23.2 g. (0.13 mole) of 3-acetylaminopiperidine hydrochloride and 7.58 g. (0.14 mole) of acrylonitrile in the presence of 15.8 g. (0.16 mole) of triethylamine]; and 1-(2-cyanoethyl)-2-cyclohexylmethylpiperidine, B.P. 106.5–111.5° C./0.07–0.09 mm., $n_D^{25}$ 1.4948 [prepared from 54.5 g. (0.03 mole) of 2-cyclohexylmethylpiperidine and 17.7 g. (0.33 mole) of acrylonitrile].

EXAMPLES 2–13

The compounds of Formula IV listed below in Table 1 were prepared from acrylonitrile and an appropriate substituted piperidine according to the procedure described above in Example 1. All melting points, given for the free base form, are corrected unless noted otherwise.

Table 1

| Example | R₂ | R₃ | Y' | M.P. | Cryst. from— |
|---------|-----|-----|-----|------|--------------|
| 2 | 4-CONHCH₃ | H | CH₂CH₂ | 116.4–117.2° C | Ethyl acetate. |
| 3 | 4-CONHC₂H₅ | H | CH₂CH₂ | 110.6–111.8° C | Benzene/hexane. |
| 4 | 4-CON(CH₃)₂ | H | CH₂CH₂ | 65.0–66.8° C | Ethyl acetate/hexane. |
| 5 | 4-CON(C₂H₅)₂ | H | CH₂CH₂ | B.P. 151–159° C./0.073–0.113 mm | |
| 6 | 4-CH₂OH | H | CH₂CH₂ | B.P. 102.0–104.1° C./0.065–0.071 mm.ᵃ | |
| 7 | 4-(CH₂)₃OH | H | CH₂CH₂ | 44.2–45.4° C | |
| 8 | 2-COOC₂H₅ | H | CH₂CH₂ | B.P. 64.1–66.5° C./0.029–0.031 mm.ᵇ | |
| 9 | 3-COOCH₃ | H | CH₂CH₂ | B.P. 68–72° C./0.023 mm.ᶜ | |
| 10 | 4-COOCH₃ | H | CH₂CH₂ | 42.4–43.4° C.ᵈ | |
| 11 | 4-COOCH₂CH(CH₃)₂ | H | CH₂CH₂ | 205–207° C./16 mm.ᵉ | |
| 12 | 4-CH₂C₆H₅ | H | CH₂CH₂ | B.P. 131.5–135° C./0.08 mm.ᶠ | |
| 13 | 4-CH₂C₆H₁₁ | H | CH₂CH₂ | B.P. 102.0–112° C./0.12 mm.ᵍ | |

ᵃ $n_D^{25} = 1.4930$.
ᵇ $n_D^{25} = 1.4675$; hydrochloride salt, recrystallized from ethanol/ether has M.P. 185–188° C. (uncorr.).
ᶜ $n_D^{25} = 1.4735$.
ᵈ B.P. 123–124° C./0.38 mm.
ᵉ $n_D^{25} = 1.4660$.
ᶠ $n_D^{25} = 1.5289$.
ᵍ $n_D^{25} = 1.4889$.

EXAMPLE 14

1 - cyanomethyl-2,6-dimethyl-4-hydroxypiperidine [IV; $R_2$ is 4-HO, $R_3$ is 2,6-di-CH₃, Y' is CH₂]: By reacting 2,6-dimethyl-4-hydroxypiperidine with an equimolar amount of α-bromoacetonitrile in the presence of an acid-acceptor, for example, sodium carbonate, in an organic solvent inert under the conditions of the reaction, for example acetonitrile, and isolating the product from an alkaline medium, there can be obtained 1-cyanomethyl-2,6-dimethyl-4-hydroxypiperidine.

EXAMPLE 15

1 - (4 - cyanobutyl)-4-hydroxy-2,2,4,6,6-pentamethylpiperidine [IV; $R_2$ is 4-HO, $R_3$ is 2,2,4,6,6-penta-CH₃, Y' is (CH₂)₄]: By reacting δ-bromovaleronitrile with 4-hydroxy-2,2,4,6,6-pentamethylpiperidine according to the manipulative procedure described above in Example 14, there can be obtained 1-(4-cyanobutyl)-4-hydroxy-2,2,4,6,6-pentamethylpiperidine.

EXAMPLES 16–20

By following the manipulative procedure described above in Example 1, replacing the 4-carbamylpiperidine used therein with a molar equivalent amount of an appropriately substituted piperidine, there can be obtained the 1-(2-cyanoethyl)-substituted-piperidines of Formula IV listed in Table 2 below where Y' in each case is CH₂CH₂.

Table 2

| Example | R₂ | R₃ |
|---------|-----|-----|
| 16 | 4-HO | 2,2-di-CH₃-6-(CH₃)₂CHCH₂. |
| 17 | 4-(CH₂)₆OH | |
| 18 | 4-NHCHO | |
| 19 | 4-NHCOCH(C₂H₅)CH₂CH₃ | |
| 20 | 3-CONHCH₂CH₂CH₂CH₃ | |

EXAMPLE 21

3 - (4 - carbamyl - 1 - piperidyl)propylamine [II; $R_2$ is 4-CONH₂, $R_3$ is H, Y is (CH₂)₃, $n$ is 1]: To a solution of 34.75 g. (0.19 mole) of 1-(2-cyanoethyl)-4-carbamylpiperidine in 450 ml. of ethanol saturated with anhydrous ammonia was added 4.2 g. of a 5% rhodium-on-alumina catalyst. The mixture was reduced with hydrogen under an initial pressure of 210 pounds p.s.i. at a temperature of 25° C. Reduction was complete in three hours. The catalyst was removed by filtration, washed with ethanol, the filtrates concentrated to dryness in vacuo and the white crystalline residue extracted with acetone, filtered, and the filtrate taken to dryness yielding 25.4 g. of a white powder which was recrystallized twice from a benzene-hexane mixture giving 22.0 g. of 3-(4-carbamyl-1-piperidyl)propylamine, M.P. 85–88° C. (uncorr.).

3 - (4 - carbamyl - 1 - piperidyl)propylamine reacts with formic acid, acetic acid, isobutyric acid, alpha-mercaptopropionic acid, malic accid, fumaric acid, succinic acid, succinamic acid, tartaric acid, citric acid, lactic acid, benzoic acid, 4-methoxybenzoic acid, phthalic acid, anthranilic acid, 1 - naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphonous acid, methylphosphonic acid, phenylphosphinic acid, Amberlite® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate, isobutyrate, alpha-mercaptoproprionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate and boron trifluoride salts.

3-(4-carbamyl-1-piperidyl)propylamine can be reacted with hydriodic acid to form 3-(4-carbamyl-1-piperidyl) propylamine hydriodide, useful as a characterizing intermediate.

3-(4-carbamyl-1-piperidyl)propylamine, in the form of its hydriodide salt, can be converted to the hydrochloride salt by passing an aqueous solution of the former over an ion-exchange resin saturated with chloride ions, for example Rohm & Haas' Amberlite® IRA–400 resin.

EXAMPLES 22–27

The following mono-[(1-piperidyl)propyl]amines of Formula I [$n$ is 1, Y is (CH₂)₃] listed below in Table 3 were prepared according to the procedure described above in Example 21 by reduction of an appropriate 1-(2-cyanoethyl)piperidine of Formula IV with hydrogen over rhodium-on-alumina catalyst and in an ethanol solution saturated with anhydrous ammonia. All melting points are corrected.

*Table 3*

| Example | $R_2$ | $R_2$ | Base or Salt | M.P. | Cryst. from— |
|---|---|---|---|---|---|
| 22 | 4-CONHCH$_3$ | H | 2HCl | 239.6–240.6° C | Ethanol/ether. |
| 23 | 4-CONHC$_2$H$_5$ | H | 2HCl | 245.0–246.2° C | Do. |
| 24 | 4-CON(CH$_3$)$_2$ | H | Base | (ª) | |
| 25 | 4-CON(C$_2$H$_5$)$_2$ | H | do | (ᵇ) | |
| 26 | 4-CH$_2$C$_6$H$_5$ | H | 2HCl | 191.6–193.4° C | Do. |
| 27 | 4-CH$_2$C$_6$H$_{11}$ | H | 2HCl | 280.2–282.4° C | Do. |

ª B.P. 123–124° C./0.09 mm., $n_D^{25}$=1.5042.
ᵇ B.P. 131–138° C./0.109–0.113 mm., $n_D^{25}$=1.4939.

EXAMPLES 28–36

By following the manipulative procedure described above in Example 21, substituting for the 1-(2-cyanoethyl)-4-carbamylpiperidine used therein, a molar equivalent amount of the 1-(cyano-lower-alkyl)-substituted-piperidines described above in Examples 6, 7, and 14–20, there can be obtained the respective (substituted-1-piperidyl)-lower-alkylamines of Formula II ($n$ is 1) listed below in Table 4.

*Table 4*

| Example | Y | $R_2$ | $R_3$ |
|---|---|---|---|
| 28 | (CH$_2$)$_3$ | 4-CH$_2$OH | |
| 29 | (CH$_2$)$_3$ | 4-CH$_2$CH$_2$CH$_2$OH | |
| 30 | (CH$_2$)$_2$ | 4-HO | 2,6-di-CH$_3$. |
| 31 | (CH$_2$)$_5$ | 4-HO | 2,2,4,6,6-penta-CH$_3$. |
| 32 | (CH$_2$)$_3$ | 4-HO | 2,2,di-CH$_3$-6-(CH$_3$)$_2$CHCH$_2$. |
| 33 | (CH$_2$)$_3$ | 4-(CH$_2$)$_6$OH | |
| 34 | (CH$_2$)$_3$ | 4-NHCHO | |
| 35 | (CH$_2$)$_3$ | 4-NHCOCH(C$_2$H$_5$)CH$_2$CH$_3$ | |
| 36 | (CH$_2$)$_3$ | 3-CONHCH$_2$CH$_2$CH$_2$CH$_3$ | |

EXAMPLE 37

Bis-{3-[4-(N-methylcarbamyl) - 1 - piperidyl]propyl} amine [II; $R_2$ is 4-CONHCH$_3$, $R_3$ is H, Y is (CH$_2$)$_3$, $n$ is 2]: 1-(2-cyanoethyl)-4-(N-methylcarbamyl)piperidine (39 g., 0.20 mole) was dissolved in 500 ml. of ethanol saturated with anhydrous ammonia and reduced over 4 g. of rhodium-on-alumina catalyst under 208 pounds p.s.i. of hydrogen. When reduction was complete, the catalyst was removed by filtration and the filtrate taken to dryness leaving a waxy white solid. The latter was extracted with five 300 ml. portions of boiling ether and the extracts, which contained the mono-amine, was set aside for further work. The ether-insoluble material was boiled with 200 ml. of acetone and dried giving 8.6 g. of material of M.P. 190–195° C. (uncorr.). The latter was recrystallized from an ethanol-acetone mixture giving 6.8 g. of bis-{3-[4 - (N - methylcarbamyl) - 1 - piperidyl]propyl} amine, M.P. 203.0–203.8° C. (corr.).

*Analysis.*—Calcd. for $C_{20}H_{39}N_5O_2$: $N_T$, 18.36; $N_B$, 11.01. Found: $N_T$, 18.29; $N_B$, 11.02.

The ether extracts, containing the mono-amine, were taken to dryness and the residue taken into ethanol and treated with an ethereal solution of anhydrous hydrogen chloride. The dihydrochloride salt which separated was collected and recrystallized from an ethanol-ether mixture giving 5.5 g. of 3-[4-(N-methylcarbamyl)-1-piperidyl]propylamine dihydrochloride, M.P. 238–240° C. (uncorr.).

Bis-{3-[4 - (N-methylcarbamyl)-1 - piperidyl]propyl} amine reacts with formic acid, acetic acid, isobutyric acid, alpha-mercaptopropionic acid, malic acid, fumaric acid, succinic acid, succinamic acid, tartaric acid, citric acid, lactic acid, benzoic acid, 4-methoxybenzoic acid, phthalic acid, anthanilic acid, 1-naphthalenecarboxylic acid, cinnamic acid, cyclohexanecarboxylic acid, mandelic acid, tropic acid, crotonic acid, acetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite ® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate, isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p - toluenesulfonate, benzenesulfinate, butylarsonate, diethylphosphinate, p-aminophenylarsinate, phenylstibnate, phenylphosphinite, methylphosphonate, phenylphosphinate, Amberlite ® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybdate, pyrophosphate, arsenate, picrate, picrolonate, barbiturate, and boron trifluoride salts.

Bis-{3-[4 - (N-methylcarbamyl)-1 - piperidyl]propyl} amine can be reacted with hydriodic acid to form bis-{3-[4-(N-methylcarbamyl)-1-piperidyl]propyl}amine hydriodide, useful as a characterizing intermediate.

Bis-{3-[4 - (N-methylcarbamyl)-1 - piperidyl]propyl} amine, in the form of its hydriodide salt, can be converted to the hydrochloride salt by passing an aqueous solution of the former over an ion-exchange resin saturated with chloride ions, for example, Rohm and Haas' Amberlite ® IRA–400 resin.

EXAMPLE 38

Bis{3-[4 - (N-Ethylcarbamyl) - 1 - piperidyl]propyl} amine [II; $R_2$ is 4-CONHC$_2$H$_5$, $R_3$ is H, Y is (CH$_2$)$_3$, $n$ is 2] was prepared from 20.9 g. (0.1 mole) of 1-(2-cyanoethyl)-4-(N-ethylcarbamyl)piperidine in 200 ml. of ethanol saturated with anhydrous ammonia according to the manipulative procedure described above in Example 37. There was thus obtained 2.5 g. of bis-{3-[4-(N-ethylcarbamyl)-1-piperidyl]propyl}amine, M.P. 191.2–192.8° C. (corr.).

EXAMPLE 39

Bis - {3-[4 - (N,N - dimethylcarbamyl)-1 - piperidyl]propyl}amine [II; $R_2$ is 4-CON$(CH_3)_2$, $R_3$ is H, Y is $(CH_2)_3$, $n$ is 2]: 1-(2-cyanoethyl)-4-(N,N-dimethylcarbamyl)piperidine (31.4 g., 0.15 mole) was dissolved in 250 ml. of ethanol and reduced over 5 g. of a rhodium-on-alumina catalyst under 40–60 pounds p.s.i. of hydrogen. When reduction was complete, the catalyst was removed by filtration and the filtrate taken to dryness. The waxy white residue was extracted with boiling hexane and the hexane extracts cooled. The white crystalline solid which separated was collected and air-dried giving 29.3 g. of material of M.P. 70–80° C. Several recrystallizations of the latter from hexane afforded 3.7 g. of bis{3-[4 - (N,N-dimethylcarbamyl)-1 - piperidyl]propyl}amine, M.P. 87.8–88.6° C. (corr.).

EXAMPLE 40

Bis[3 - (4-benzyl-1 - piperidyl)propyl]amine trihydrochloride [II; $R_2$ is 4-$CH_2C_6H_5$, $R_3$ is H, Y is $(CH_2)_3$, $n$ is 2] was prepared by reducing 30.0 g. (0.13 mole) of 1-(2-cyanoethyl)-4-benzylpiperidine in ethanol over 3.2 g. of a rhodium-on-alumina catalyst under 40–60 pounds p.s.i. of hydrogen. The crude product was distilled in vacuo, and the fraction boiling at 87–98° C./0.06 mm. was collected as product ($n_D^{25}$=1.5266).

A small amount of the base in dry ether was converted to the trihydrochloride salt by addition of ethereal hydrogen chloride giving bis-[3-(4-benzyl-1-piperidyl)propyl]amine trihydrochloride, M.P. 266.6–268.0° C. (corr.).

EXAMPLE 41

Bis - [3-(4-cyclohexylmethyl-1-piperidyl)propyl]amine trihydrochloride [II; $R_2$ is 4-$CH_2C_6H_{11}$, $R_3$ is H, Y is $(CH_2)_3$, $n$ is 2] was prepared by reducing 59.9 g. (0.26 mole) of 1-(2-cyanoethyl)-4-cyclohexylmethylpiperidine in ethanol saturated with anhydrous ammonia over 5.0 g. of a rhodium-on-alumina catalyst under 780 pounds p.s.i. of hydrogen. The crude product was distilled in vacuo, and the fraction boiling at 214–229° C./0.0003 mm. was collected as product ($n_D^{25}$=1.5066). The latter was dissolved in dry ether and acidified by addition of ethereal hydrogen chloride. The salt which separated was collected and recrystallized from isopropanol-ether giving bis-[3-(4-cyclohexylmethyl-1-piperidyl)propyl]amine trihydrochloride, M.P. >300.0° C.

EXAMPLES 42–50

By following the manipulative procedure described above in Example 37, substituting for the 1-(2-cyanoethyl)-4-(N-methylcarbamyl)piperidine used therein, a molar equivalent amount of the 1-(cyano-lower-alkyl)-substituted-piperidines described above in Examples 6, 7, and 14–20, there can be obtained the respective bis-[(substituted-1-piperidyl)-lower-alkyl]amines of Formula II ($n$ is 2) listed below in Table 5.

no)-7-chloroquinoline [Ia; $R_1$ is 7-Cl, $R_2$ is 4-CONH$CH_3$, $R_3$ is H, Y is $(CH_2)_3$, $n$ is 1]: A mixture of 11.9 g. (0.06 mole) of 4,7-dichloroquinoline, 17.9 g. (0.09 mole) of 3 - [4-(N-methylcarbamyl)-1-piperidyl]propylamine, and 35 g. of phenol was heated with stirring at 115–125° C. for twenty-four hours. The mixture while still warm was dissolved in 300 ml. of chloroform and the solution extracted with three 100 ml. portions of 10% hydrochloric acid. The combined acid extracts were basified with concentrated ammonium hydroxide, extracted with chloroform, and the chloroform extracts dried over Drierite ® and taken to dryness. The residue was dissolved in 10% acetic acid, filtered and the filtrate basified with concentrated ammonium hydroxide. The brown gum which separated was washed by decantation with water, triturated with ethyl acetate and the resulting solid was collected and recrystallized from an ethanol-ethyl acetate mixture giving 9.4 g. of 4-{3-[4-(N-methylcarbamyl) - 1-piperidyl]propylamino}-7-chloroquinoline, M.P. 174.8–175.4° C. (corr.).

4 - {3-[4-(N-methylcarbamyl)-1-piperidyl]propylamino}-7-chloroquinoline reacts with formic acid, acetic acid, isobutyric acid, alpha-mercaptopropionic acid, malic acid, fumaric acid, succinic acid, succinamic acid, tartaric acid, citric acid, lactic aid, benzoic acid, 4-methoxybenzoic acid, phthalic acid, anthranilic acid, 1-naphthalenecarboxylic acid, cinnamic acid, cyclohexanecarboxylic acid, mandelic acid, tropic acid, crotonic acid, aetylene dicarboxylic acid, sorbic acid, 2-furancarboxylic acid, cholic acid, pyrenecarboxylic acid, 2-pyridinecarboxylic acid, 3-indoleacetic acid, quinic acid, sulfamic acid, methanesulfonic acid, isethionic acid, benzenesulfonic acid, p-toluenesulfonic acid, benzenesulfinic acid, butylarsonic acid, diethylphosphinic acid, p-aminophenylarsinic acid, phenylstibnic acid, phenylphosphinous acid, methylphosphonic acid, phenylphosphinic acid, Amberlite ® XE–66 resin, hydrofluoric acid, hydrochloric acid, hydrobromic acid, hydriodic acid, perchloric acid, nitric acid, sulfuric acid, phosphoric acid, hydrocyanic acid, phosphotungstic acid, molybdic acid, phosphomolybdic acid, pyrophosphoric acid, arsenic acid, picric acid, picrolonic acid, barbituric acid, boron trifluoride, and the like, to give respectively, the formate, acetate isobutyrate, alpha-mercaptopropionate, malate (or acid malate), fumarate (or acid fumarate), succinate (or acid succinate), succinamate, tartrate (or bitartrate), citrate (or acid citrate), lactate, benzoate, 4-methoxybenzoate, phthalate (or acid phthalate), anthranilate, 1-naphthalenecarboxylate, cinnamate, cyclohexanecarboxylate, mandelate, tropate, crotonate, acetylene dicarboxylate, sorbate (or acid sorbate), 2-furancarboxylate, cholate, pyrenecarboxylate, 2-pyridinecarboxylate, 3-indoleacetate, quinate, sulfamate, methanesulfonate, isethionate, benzenesulfonate, p-toluenesulfonate, benzenesulfinate, butylarsonate, diethylphosphinate, p-aminophenylarsinate, phenylstibnate, phenylphosphinite, methylphosphonate, phenylphosphinate, Amberlite ® XE–66 resin salt, hydrofluoride, hydrochloride, hydrobromide, hydriodide, perchlorate, nitrate, sulfate (or bisulfate), phosphate (or acid phosphate), hydrocyanide, phosphotungstate, molybdate, phosphomolybd- Table 5

| Example | Y | $R_2$ | $R_3$ |
|---|---|---|---|
| 42 | $(CH_2)_3$ | 4-$CH_2OH$ | |
| 43 | $(CH_2)_3$ | 4-$CH_2CH_2CH_2OH$ | |
| 44 | $(CH_2)_2$ | 4-HO | 2, 6-di-$CH_3$. |
| 45 | $(CH_2)_5$ | 4-HO | 2, 2, 4, 6, 6-penta-$CH_3$. |
| 46 | $(CH_2)_3$ | 4-HO | 2, 2-di-$CH_3$-6-$(CH_3)_2CHCH_2$. |
| 47 | $(CH_2)_3$ | 4-$(CH_2)_6OH$ | |
| 48 | $(CH_2)_3$ | 4-NHCHO | |
| 49 | $(CH_2)_3$ | 4-NHCOCH$(C_2H_5)CH_2CH_3$ | |
| 50 | $(CH_2)_3$ | 3-CONH$CH_2CH_2CH_2CH_3$ | |

EXAMPLE 51

4 - {3-[4-(N-methylcarbamyl)-1-piperidyl]propylamiate, pyrophosphate, arsenate, picrate, picrolonate, barbiturate and boron trifluoride salts 4 - {3-[4-(N-methylcarbamyl)-1-piperidyl]propylamino}-7-chloroquinoline can be reacted with hydriodic acid to form 4-{3-[4-(N-methylcarbamyl)-1-piperidyl]propylamino}-7-chloroquinoline hydrodide, useful as a characterizing intermediate.

4 - {3-[4-(N-methylcarbamyl)-1-piperidyl]propylamino}-7-chloroquinoline, in the form of its hydriodide salt, can be converted to the hydrochloride salt by passing an aqueous solution of the former over an ion-exchange resin saturated with fluoride ions, for example, Rohm & Haas' Amberlite ® IRA-400 resin.

EXAMPLES 58–81

By following the manipulative procedure described above in Example 51, substituting for the 4,7-dichloroquinoline and the 3-[4-(N-methylcarbamyl)-1-piperidyl] propylamine used therein, molar equivalent amounts of an appropriate 4-halo-substituted-quinoline and an appropriate mono- or bis-[(substituted-1-piperidyl)-loweralkyl]amine, there can be obtained the 4-(mono- or bis-[(substituted - 1 - piperidyl)-lower-alkyl]amino}-substituted-quinolines of Formula Ia ($n$ is 1) listed below in Table 7:

Table 7

| Example | Y/$R_1$ | $R_2$/$R_3$ | $n$ |
|---|---|---|---|
| 58 | (CH$_2$)$_3$ / 5-CH$_3$O | 4-CH$_2$OH | 1 |
| 59 | (CH$_2$)$_3$ / 7-CH$_3$S | 4-CH$_2$CH$_2$CH$_2$OH | 1 |
| 60 | (CH$_2$)$_2$ / 7-CH$_3$SO | 4-HO, 2,6-di-CH$_3$ | 1 |
| 61 | (CH$_2$)$_5$ / 7-CH$_3$SO$_2$ | 4-HO, 2,2,4,6,6-penta-CH$_3$ | 1 |
| 62 | (CH$_2$)$_3$ / 7-C$_6$H$_5$CH$_2$O | 4-HO, 2,2-di-CH$_3$-6-(CH$_3$)$_2$CHCH$_2$ | 1 |
| 63 | (CH$_2$)$_3$ / 7-(4-ClC$_6$H$_4$CH$_2$O) | 4-(CH$_2$)$_6$OH | 1 |
| 64 | (CH$_2$)$_3$ / 7-(4-HOC$_6$H$_4$CH$_2$O) | 4-NHCHO | 1 |
| 65 | (CH$_2$)$_3$ / 7-(3,4-OCH$_2$OC$_6$H$_3$CH$_2$O) | 4-NHCOCH(C$_2$H$_5$)CH$_2$CH$_3$ | 1 |
| 66 | (CH$_2$)$_3$ / 7-(3-CH$_3$C$_6$H$_4$CH$_2$O) | 3-CONHCH$_2$CH$_2$CH$_2$CH$_3$ | 1 |
| 67 | (CH$_2$)$_3$ / 7-(3-CH$_3$SO$_2$C$_6$H$_4$CH$_2$O) | 4-CONH$_2$ | 1 |
| 68 | (CH$_2$)$_3$ | 4-CONH$_2$ | 1 |
| 69 | (CH$_2$)$_3$ / 5-CH$_3$O | 4-CON(CH$_3$)$_2$ | 2 |
| 70 | (CH$_2$)$_3$ / 7-CH$_3$S | 4-CH$_2$OH | 2 |
| 71 | (CH$_2$)$_3$ / 7-CH$_3$SO | 4-CH$_2$CH$_2$CH$_2$OH | 2 |
| 72 | (CH$_2$)$_2$ / 7-CH$_3$SO$_2$ | 4-HO, 2,6-di-CH$_3$ | 2 |
| 73 | (CH$_2$)$_5$ / 7-C$_6$H$_5$CH$_2$CH$_2$O | 4-HO, 2,2,4,6,6-penta-CH$_3$ | 2 |
| 74 | (CH$_2$)$_3$ / 7-(4-ClC$_6$H$_4$CH$_2$CH$_2$O) | 4-HO, 2,2-di-CH$_3$-6-(CH$_3$)$_2$CHCH$_2$ | 2 |
| 75 | (CH$_2$)$_3$ / 7-(4-HOC$_6$H$_4$CH$_2$CH$_2$O) | 4-(CH$_2$)$_6$OH | 2 |
| 76 | (CH$_2$)$_3$ / 7-(3,4-OCH$_2$OC$_6$H$_3$CH$_2$CH$_2$O) | 4-NHCHO | 2 |
| 77 | (CH$_2$)$_3$ / 7-(3-CH$_3$C$_6$H$_4$CH$_2$CH$_2$O) | 4-NHCOCH(C$_2$H$_5$)CH$_2$CH$_3$ | 2 |
| 78 | (CH$_2$)$_3$ / 7-(2-CH$_3$OC$_6$H$_4$CH$_2$CH$_2$O) | 3-CONHCH$_2$CH$_2$CH$_2$CH$_3$ | 2 |
| 79 | (CH$_2$)$_3$ | 4-CONH$_2$ | 2 |
| 80 | (CH$_2$)$_3$ | 4-CH$_2$C$_6$H$_5$ | 2 |
| 81 | (CH$_2$)$_3$ | 4-CH$_2$C$_6$H$_{11}$ | 2 |

EXAMPLES 52–57

The following compounds of Formula Ia listed below in Table 6 were prepared according to the manipulative procedure described above in Example 51 using 4,7-dichloroquinoline and an appropriate mono- or bis-[(1-piperidyl)-lower-alkyl]amine. In each case $R_1$ is 7-Cl, $R_3$ is H, and Y is (CH$_2$)$_3$. All melting points are corrected.

EXAMPLE 82

2 - [3-(4-carbamyl-1-piperidyl)propylamino]quinoline [Ib; $R_1$ is H, $R_2$ is 4-CONH$_2$, $R_3$ is H, $n$ is 1]: By reacting 2-chloroquinoline with 3-(4-carbamyl-1-piperidyl)propylamine according to the manipulative procedure described above in Example 51, there can be obtained 2-[3-(4-carbamyl-1-piperidyl)propylamino]quinoline.

Table 6

| Example | $R_2$ | $n$ | M.P. | Cryst. from— |
|---|---|---|---|---|
| 52 | 4-CONH$_2$ | 1 | 217.4–219.6° C | Ethanol/ethyl acetate. |
| 53 | 4-CONHC$_2$H$_5$ | 1 | 188.2–188.8° C | Do. |
| 54 | 4-CON(CH$_3$)$_2$ | 1 | 187.2–184.4° C | Acetone. |
| 55 | 4-CON(C$_2$H$_5$)$_2$ | 1 | 140.0–140.6° C | Ethyl acetate/hexane. |
| 56 | 4-CONHCH$_3$ | 2 | 164.0–165.0° C | Ethanol/ethyl acetate. |
| 57 | 4-CONHC$_2$H$_5$ | 2 | 165.4–166.2° C | Do. |

EXAMPLES 83–96

By following the manipulative procedure described above in Example 51, substituting for the 4,7-dichloroquinoline and the 3-[4-(N-methylcarbamyl)-1-piperidyl]-propylamine used therein, molar equivalent amounts of an appropriate 2-halo-substituted-quinoline and an appropriate (substituted - 1 - piperidyl)-lower-alkylamine, there can be obtained the 2-[(substituted-1-piperidyl)-lower-alkylamino]-substituted-quinolines of Formula Ib ($n$ is 1) listed below in Table 8:

EXAMPLE 112

1-(5-cyanopentyl)-4-cyclohexylmethylpiperidine [IV: $R_2$ is 4-$C_6H_{11}CH_2$, $R_3$ is H, Y' is $(CH_2)_5$]: A mixture of 72.5 g. (0.4 mole) of 4-cyclohexylmethylpiperidine and 35.2 g. (0.2 mole) of ω- bromocapronitrile in 150 ml. of benzene was heated under reflux for four hours, filtered to remove the crystalline solid which had separated, and the filter washed with hexane and ether. The filtrate and washings were combined, taken to dryness in vacuo, and the residual oil dissolved in 100 ml. of hexane and filtered.

Table 8

| Example | Y/$R_1$ | $R_2$/$R_3$ |
|---|---|---|
| 83 | $(CH_2)_3$ / 7-Cl | 4-CONHCH$_3$. |
| 84 | $(CH_2)_3$ / 7-Cl | 4-CONHC$_2$H$_5$. |
| 85 | $(CH_2)_3$ / 7-Cl | 4-CON(CH$_3$)$_2$. |
| 86 | $(CH_2)_3$ / 7-Cl | 4-CON(C$_2$H$_5$)$_2$. |
| 87 | $(CH_2)_3$ / 5-CH$_3$O | 4-CH$_2$OH. |
| 88 | $(CH_2)_3$ / 7-CH$_3$S | 4-CH$_2$CH$_2$CH$_2$OH. |
| 89 | $(CH_2)_2$ / 7-CH$_3$SO | 4-HO. 2,6-di-CH$_3$. |
| 90 | $(CH_2)_5$ / 7-CH$_3$SO$_2$ | 4-HO. 2,2,4,6,6-penta-CH$_3$. |
| 91 | $(CH_2)_3$ / 7-C$_6$H$_5$CH$_2$O | 4-HO. 2,2-di-CH$_3$-6-(CH$_3$)$_2$CHCH$_2$. |
| 92 | $(CH_2)_3$ / 7-(4-ClC$_6$H$_4$CH$_2$O) | 4-(CH$_2$)$_6$OH. |
| 93 | $(CH_2)_3$ / 7-(4-HOC$_6$H$_4$CH$_2$O) | 4-NHCHO. |
| 94 | $(CH_2)_3$ / 7-(3,4-OCH$_2$OC$_6$H$_3$CH$_2$O) | 4-NHCOCH(C$_2$H$_5$)CH$_2$CH$_3$. |
| 95 | $(CH_2)_3$ / 7-(3-CH$_3$C$_6$H$_4$CH$_2$O) | 3-CONHCH$_2$CH$_2$CH$_2$CH$_3$. |
| 96 | $(CH_2)_3$ / 7-(3-CH$_3$SO$_2$C$_6$H$_4$CH$_2$O) | 4-CONH$_2$. |

EXAMPLES 97–111

By following the manipulative procedure described above in Example 51, substituting for the 4,7-dichloroquinoline and the 3-[4-methylcarbamyl)-1-piperidyl]-propylamine used therein molar equivalent amounts of an appropriate 2-halo-substituted-quinoline and an appropriate bis-[(substituted-1-piperidyl) - lower - alkyl]-amine, there can be obtained the 2-{bis-[(substituted-1-piperidyl)-lower-alkyl]amino}-substituted - quinolines of Formula Ib ($n$ is 2) listed below in Table 9:

The solid which crystallized from the cooled filtrate was collected and recrystallized twice more from hexane to give 40.3 g. of 1-(5-cyanopentyl)-4-cyclohexylmethylpiperidine, M.P. 40.0–42.8° C. (corr.).

Following a procedure similar to that described above for the preparation of 1-(5-cyanopentyl)-4-cyclohexylmethylpiperidine, there was obtained 1-(3-cyanopropyl)-4-cyclohexylmethylpiperidine, M.P. 45.6–55.2° C. (corr.) [prepared from 36.2 g. (0.2 mole)

Table 9

| Example | Y/$R_1$ | $R_2$/$R_3$ |
|---|---|---|
| 97 | $(CH_2)_3$ / 7-Cl | 4-CONHCH$_3$. |
| 98 | $(CH_2)_3$ / 7-Cl | 4-CONHC$_2$H$_5$. |
| 99 | $(CH_2)_3$ / 5-CH$_3$O | 4-CON(CH$_3$)$_2$. |
| 100 | $(CH_2)_3$ / 7-CH$_3$S | 4-CH$_2$OH. |
| 101 | $(CH_2)_3$ / 7-CH$_3$SO | 4-CH$_2$CH$_2$CH$_2$OH. |
| 102 | $(CH_2)_2$ / 7-CH$_3$SO$_2$ | 4-HO. 2,6-di-CH$_3$. |
| 103 | $(CH_2)_5$ / 7-C$_6$H$_5$CH$_2$CH$_2$O | 4-HO. 2,2,4,6,6-penta-CH$_3$. |
| 104 | $(CH_2)_3$ / 7-(4-ClC$_6$H$_4$CH$_2$CH$_2$O) | 4-HO. 2,2-di-CH$_3$-6-(CH$_3$)$_2$CHCH$_2$. |
| 105 | $(CH_2)_3$ / 7-(4-HOC$_6$H$_4$CH$_2$CH$_2$O) | 4-(CH$_2$)$_6$OH. |
| 106 | $(CH_2)_3$ / 7-(3,4-OCH$_2$OC$_6$H$_3$CH$_2$CH$_2$O) | 4-NHCHO. |
| 107 | $(CH_2)_3$ / 7-(3-CH$_3$C$_6$H$_4$CH$_2$O) | 4-NHCOCH(C$_2$H$_5$)CH$_2$CH$_3$. |
| 108 | $(CH_2)_3$ / 7-(2-CH$_3$OC$_6$H$_4$CH$_2$CH$_2$O) | 3-CONHCH$_2$CH$_2$CH$_2$CH$_3$. |
| 109 | $(CH_2)_3$ | 4-CONH$_2$. |
| 110 | $(CH_2)_3$ | 4-CH$_2$C$_6$H$_5$. |
| 111 | $(CH_2)_3$ | 4-CH$_2$C$_6$H$_{11}$. | of 4-cyclohexylmethylpiperidine and 14.8 g. (0.1 mole) of ω-bromobutyronitrile];

1-(4-cyanobutyl) - 2 - cyclohexylmethylpiperidine hydrochloride, M.P. 150.0–152.4° C. (corr.) [prepared from 36.2 g. (0.20 mole) of 2-cyclohexylmethylpiperidine and 16.2 g. (0.10 mole) of ω-bromovaleronitrile];

1-(4-cyanobutyl) - 4 - cyclohexylmethylpiperidine hydrochloride, M.P. 204.8–206.0° C. (corr.) [prepared from 36.2 g. (0.20 mole) of 4-cyclohexylmethylpiperidine and 16.2 g. (0.10 mole) of ω-bromovaleronitrile;

1-cyanomethyl-4-cyclohexylmethylpiperidine, M.P. 78.5–79.8° C. (corr.) [prepared from 36.2 g. (0.20 mole) of 4-cyclohexylmethylpiperidine and 7.55 g. (0.10 mole) of chloroacetonitrile];

1-(6-cyanohexyl) - 4 - cyclohexylmethylpiperidine hydrochloride, M.P. 187.4–189.0° C. (corr.) [prepared from 20.0 g. (0.11 mole) of 4-cyclohexylmethylpiperidine and 19.0 g. (0.10 mole) of ω-bromoheptanonitrile in the presence of 20.6 g. (0.15 mole) of potassium carbonate in 60 ml. of absolute ethanol]; and 1-(5-cyanopentyl) - 4 - (N - phenyl-N-acetylamino)-piperidine, M.P. 55.2–56.4° C. (corr.) [prepared from 16.3 g. (0.075 mole) of 4-(N-phenyl-N-acetylamino)-piperidine and 13.2 g. (0.075 mole) of ω-bromocapronitrile in the presence of 15.6 g. (0.112 mole) of potassium carbonate in 100 ml. of absolute ethanol].

In a similar fashion 1-cyanomethyl-2-(2-cyclopentylethyl)piperidine is prepared from 2-(2-cyclopentylethyl)piperidine and chloroacetonitrile, and 1-(3-cyanopropyl)3-(2-cycloheptylethyl)piperidine is prepared from 3-(2-cycloheptylethyl)-piperidine and ω-bromobutyronitrile.

The compounds of Formulas Ia and Ib have been shown to possess hypotensive, antimalarial, anthelmintic and Trichomonacidal activities. As representative of these various activities shown by these compounds are the following:

The average effective dose$_{50}$ (AED$_{50}$) of 4-<N,N-bis-{3 - [4-(N-methylcarbamyl)-1-piperidyl]propyl}amino>-7-chloroquinoline, prepared above in Example 56, administered subcutaneously in the renal hypertensive rat, was found to be about 10 mg./kg.; the AED$_{50}$ of 4-{3-[4 - (N,N-dimethylcarbamyl)-1-piperidyl]propylamino}7-chloroquinoline, prepared above in Example 54, administered subcutaneously in the renal hypertensive rat, was found to be 17.5 mg./kg.;

4-{3-[4-(N - methylcarbamyl) - 1 - piperidyl]propylamino}-7-chloroquinoline, prepared above in Example 51, tested against various species of the malarial parasite Plasmodium, was found to be effective at a dose level of 25 mg./kg./day; 4 - {3-[4-(N-N-dimethylcarbamyl)-1-piperidyl]propylamino}-7-chloroquinoline, prepared above in Example 54, tested against the malarial parasite, *Plasmodium lophurae,* was found to be effective at a dose level of 10 mg./kg./day; and 4-[3-(4-carbamyl-1-piperidyl)propylamino]-7-chloroquinoline, prepared above in Example 52, tested against various species of the malarial parasite, Plasmodium, was found to be effective at a dose level of 20 mg./kg./day;

4 - [3-(4-carbamyl-1-piperidyl)propylamino]-7-chloroquinoline, prepared above in Example 52, administered to Swiss mice infected with the nematode, *Syphacea obvelata,* and the tapeworm *Hymenolepis nana,* cleared 80% of the aminals of the infections in both cases at a dose level of 200 mg./kg./day; and 4-{3-[4-(N-methylcarbamyl)-1-piperidyl]propylamino} - 7 - chloroquinoline, prepared above in Example 51, administered to Swiss mice infected with the tapeworm, *Hymenolepis nana,* and the nematode, *Aspicularis tetraptera,* cleared 60% of the animals of the former infection and 70% of the animals of the latter infection at a dose level of 400 mg./kg./day.

4-{3-[4-(N - methylcarbamyl) - 1 - piperidyl]propylamino}-7-chloroquinoline, prepared above in Example 51, tested in hamsters, was found to be trichomonacidally effective at a dose level of 100 mg./kg./day.

The compounds of Formula II have been shown to possess hypotensive and coronary dilator activities. As representative of these activities shown by the compounds of the invention are the following:

3-[4-N - ethylcarbamyl) - 1 - piperidyl]propylamine dihydrochloride, prepared above in Example 23, administered subcutaneously in the anesthetized dog or subcutaneously in the renal hypertensive rat, was found in both cases to have a minimum effective hypotensive dose (MEHD) of 1.0 mg./kg; 3-[4-N,N-diethylcarbamyl)1-piperidyl]propylamine, prepared above in Example 25, administered subcutaneously in the anesthetized dog, was found to have an MEHD of 1.0 mg./kg.; and bis-{3-[4-(N-methylcarbamyl)-1-piperidyl]-propyl}amine, prepared above in Example 37, administered subcutaneously in the anesthetized dog, was found to have an MEHD of 1.0 mg./kg.;

3-[4-(N-methylcarbamyl)-1-piperidyl]propylamine dihydrochloride prepared above in Example 22, was found to produce 1.8% dilatation at a dose level of 0.1 mg. in the isolated rabbit heart.

The compounds of Formula IV have been shown to possess hypotensive, monoamine oxidase inhibitory, and antibacterial activities. As representative of these activities shown by the compounds of the invention are the following:

1-(2-cyanoethyl)-4-carbamylpiperidine, prepared above in Example 1, administered subcutaneously in the anesthetized dog, was found to have an MEHD of 1.0 mg./kg.; 1 - (2-cyanoethyl)-4-(N-methylcarbamyl)piperidine, prepared above in Example 2, administered subcutaneously in the anesthetized dog and subcutaneously in the renal hypertensive rat, was found to have an MEHD in both cases of 1.0 mg./kg.; 1-(2-cyanoethyl)-4-(N,N-dimethylcarbamyl)piperidine, prepared above in Example 4, administered subcutaneously in the anesthetized dog and subcutaneously in the renal hypertensive rat, was found to have an MEHD in both cases of 1.0 mg./kg.; and 1-(2-cyanoethyl)-4-carbomethoxypiperidine, prepared above in Example 10, administered subcutaneously in the anesthetized dog, was found to have an MEHD of 0.0005 mg./kg. Similarly, the compounds 1-(2-cyanoethyl)-2-carbethoxypiperidine, 1-(2-cyanoethyl)-3-carbomethoxypiperidine, 1-(2-cyanoethyl)-4-hydroxypiperidine, 1-(2-cyanoethyl)-3-acetylaminopiperidine, 1 - (2 - cyanoethyl) - 4-cyclohexylmethylpiperidine, 1-(4-cyanobutyl)-2-cyclohexylmethylpiperidine hydrochloride, and 1-(3-cyanopropyl)-4-cyclohexylmethylpiperidine were all tested in the renal hypertensive rat and found to have hypotensive activity.

1-(2-cyanoethyl)-4-(N,N - diethylcarbamyl)piperidine, prepared above in Example 5, was found to be about one-tenth as active as iproniazid as a monoamine oxidase inhibiting agent.

In standard serial dilution tests, 1-(2-cyanoethyl)-4-(N-ethylcarbamyl)piperidine, prepared above in Example 3, was found to be bacteriostatically effective at a dilution of about 1:1,000 vs. *Staph. aureus, Cl, welchii, Ps. aeruginosa,* and *E. typhi.*

The compounds can be prepared for use by dissolving under sterile conditions a salt form of the compounds in water (or an equivalent amount of a non-toxic acid if the free base is used), or in a physiologically compatible aqueous medium such as saline; and stored in ampoules for intramuscular injection. Alternatively, they can be incorporated in unit dosage form as tablets or capsules for oral administration either alone or in combination with suitable adjuvants such as calcium carbonate, starch, lactose, talc, magnesium stearate, gum acacia, and the like. Still further the compounds can be formulated for oral administration in aqueous alcohol, glycol or oil solutions or oil-water emulsions in the same manner as conventional medicinal substances are prepared. When used as hypotensive agents, they are formulated and used in the same manner as conventional hypotensive agents, such as reserpine preparations, and indeed can be used advan-

We claim:
1. A compound having the formula

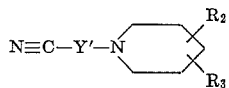

where $R_2$ is a member of the group consisting of carbamyl, N-lower-alkylcarbamyl, N,N-di-lower-alkylcarbamyl, hydroxy in other than the 2-position, lower alkanoylamino in other than the 2-position, N-phenyl-N-lower alkylamino in other than the 2-position, N-phenyl-N-lower-alkanolyamino in other than the 2-position, and cycloalkyl-lower-alkyl containing from five to seven ring carbon atoms and from one to two carbon atoms in the lower-alkyl moiety; $R_3$ is a member of the group consisting of hydrogen and from one to five lower alkyls; and Y' is lower-alkylene containing from one to seven carbon atoms.

2. A compound having the formula

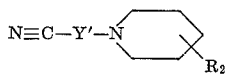

where $R_2$ is carbamyl, and Y' is lower-alkylene containing from one to seven carbon atoms.

3. A compound having the formula

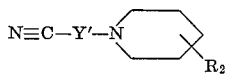

where $R_2$ is N-lower-alkylcarbamyl, and Y' is lower-alkylene containing from one to seven carbon atoms.

4. A compound having the formula

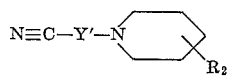

where $R_2$ is N,N-di-lower-alkylcarbamyl, and Y' is lower-alkylene containing from one to seven carbon atoms.

5. A compound having the formula

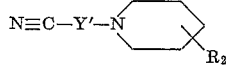

where $R_2$ is cycloalkyl-lower-alkyl containing from five to seven ring carbon atoms and from one to two carbon atoms in the lower-alkyl moiety, and Y' is lower-alkylene containing from one to seven carbon atoms.

6. 1-(2-cyanoethyl)-4-carbamylpiperidine.
7. 1-(2-cyanoethyl)-4-(N-methylcarbamyl)piperidine.
8. 1-(2-cyanoethyl)-4-(N-ethylcarbamyl)piperidine.
9. 1 - (2 - cyanoethyl) - 4 - (N,N - dimethylcarbamyl)-piperidine.
10. 1 - (2 - cyanoethyl) - 4 - (N,N - diethylcarbamyl)-piperidine.
11. 1-(2-cyanoethyl)-2-carbethoxypiperidine.
12. 1-(2-cyanoethyl)-3-carbomethoxypiperidine.
13. 1-(2-cyanoethyl)-4-carbomethoxypiperidine.
14. 1-(2-cyanoethyl)-4-carboisobutoxypiperidine.
15. 1-(2-cyanoethyl)-4-cyclohexylmethylpiperidine.

No references cited.

WALTER A. MODANCE, *Primary Examiner.*

A. D. SPEVACK, *Assistant Examiner.*

UNITED STATES PATENT OFFICE
CERTIFICATE OF CORRECTION

Patent No. 3,262,936                                                July 26, 1966

Bernard L. Zenitz et al.

It is hereby certified that error appears in the above numbered patent requiring correction and that the said Letters Patent should read as corrected below.

Column 1, line 31, for "whch" read -- which --; column 2, line 22, for "plenyl-" read -- phenyl- --; line 24, for "phenyl-moiety" read -- phenyl moiety --; column 8, line 18, for "sulfmate" read -- sulfamate --; line 67, for "54.5 g." read -- 54.4 g. --; column 10, line 23, for "accid" read -- acid --; line 43, for "-mercaptoproprionate" read -- -mercaptopropionate --; column 11, Table 3, footnote b thereof, for "1.4939" read -- 1.4938 --; column 14, line 29, for "aetylene" read -- acetylene --; column 15, line 4, for "hydrodide" read -- hydriodide --; column 16, Table 7, second column, line 3 thereof, for "$CH_2)_3$" read -- $(CH_2)_3$ --; column 17, line 43, for "3-[4-" read -- 3-[4-(N- --; column 20, line 10, for "3-[4-N,N-" read -- 3-[4-(N,N- --; column 21, line 13, for "alkanolyamino" read -- alkanoylamino --.

Signed and sealed this 1st day of August 1967.

(SEAL)
Attest:

EDWARD M. FLETCHER, JR.                                EDWARD J. BRENNER
Attesting Officer                                           Commissioner of Patents